Dec. 15, 1942.    H. HOPKES    2,305,530
SEAT CONSTRUCTION
Filed Nov. 4, 1940    2 Sheets-Sheet 1

INVENTOR
Henry Hopkes.
BY Harness, Dickey & Pierce
ATTORNEYS.

Dec. 15, 1942.  H. HOPKES  2,305,530

SEAT CONSTRUCTION

Filed Nov. 4, 1940  2 Sheets-Sheet 2

INVENTOR
Henry Hopkes.
BY Harness, Dickey & Pierce.
ATTORNEYS.

Patented Dec. 15, 1942

2,305,530

UNITED STATES PATENT OFFICE 2,305,530

SEAT CONSTRUCTION

Henry Hopkes, Grosse Pointe, Mich., assignor to No-Sag Spring Company, Detroit, Mich., a corporation of Michigan Application November 4, 1940, Serial No. 364,174

12 Claims. (Cl. 155—179)

My invention relates to spring constructions, and particularly to a new and novel seat construction for davenports, chairs and the like.

When employing the sinuous type of spring, such as shown in the Kaden Reissue Patent No. 21,263, difficulty has always been experienced in obtaining a soft front edge to the seat cushions of davenports and chairs and the like. The present invention embodies the use of continuous strips of the sinuous springs extending laterally across the frame of the seat cushion. In extended seats such as on davenports, coil springs may be provided between the ends of the spring so as to control the degree of deflection of the sinuous strips when occupied. To provide resilient support for the spring strips at the front edge, jack springs of unique construction are utilized. The jack springs have the lower arm pivotally attached to the front cross member of the cushion, while the upper arm projects upwardly above the spring surface. The upper arm is reversely bent forming a U-shaped end that follows the slope of the upper arm portion to the spring surface where it extends parallel to the surface crossing the springs strips and is bent laterally to extend along the rearmost strip. The frontmost spring strip is thereby provided with additional spring support by the jack spring portion, the extended portion of which is hog ringed or otherwise secured to each of the spring strips. The laterally bent end of the extended arm portion is anchored to the rearmost strip which is free to deflect relative to the seat frame.

A front border element has its ends anchored to one or more of the front spring strips near the side members of the frame and extends across and above the front frame member where it is tied to the U-shaped portion of the jack springs. This border element provides a resilient upwardly extending marginal edge to the cushion over which the upholstery trim material may be drawn to provide shape to the front end of the cushion. A recessed portion may be provided rearwardly thereof for the reception of the removable cushions for chairs, davenports, or the like when removable cushions are to be employed.

Accordingly, the main objects of my invention are: to provide a plurality of sinuous strips laterally of the frame of a seat which are tied together by the extension of an arm of a jack spring; to provide a spring surface from a plurality of sinuous spring elements which are anchored at their ends and interconnected by wires which are joined to jack springs to provide a spring edge; to form a seat cushion by providing sinuous spring strips transversely thereof interconnected at spaced points by wires which extend forwardly of the strips and joined to a border wire, and are further extended and formed into jack springs to provide a resilient support for the border wire and the frontmost sinuous spring strips; to support a plurality of sinuous spring strips by attaching the ends to the side rails of a seat frame and joining the strips by wires which extend forwardly of the frontmost strip where they are joined to a border wire from which they are deflected downwardly and formed into a jack spring to provide resilient support to the front end of the surface which may be further supported at spaced points by coil springs joined at spaced points to the sinuous spring strips; and in general, to provide a spring surface for a seat which is of unique construction and economical of manufacture.

Other objects and features of novelty of my invention will be either specifically pointed out or will become apparent when referring, for a better understanding of my invention, to the following description taken in conjunction with the accompanying drawings, wherein.

Figure 1:
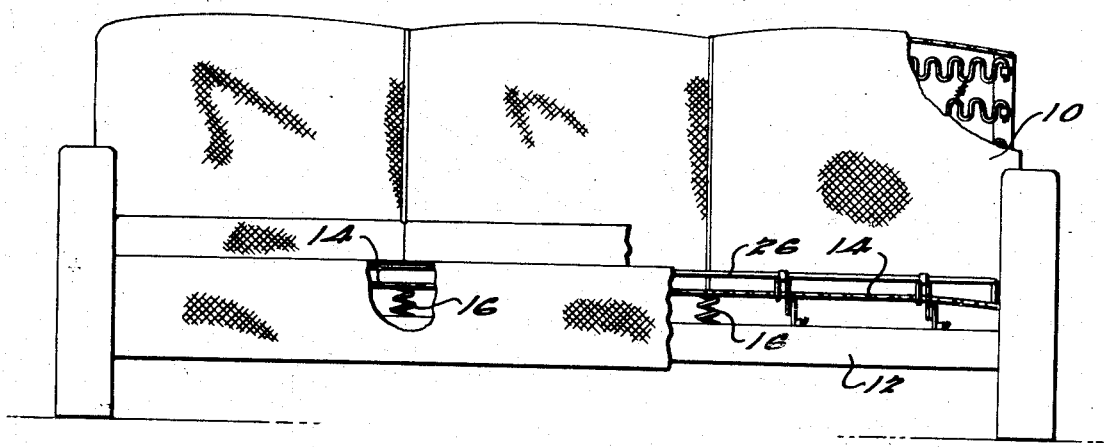
Figure 1 is a view in elevation of a seat, with parts broken away, illustrating a construction embodying my invention.
Figure 2:
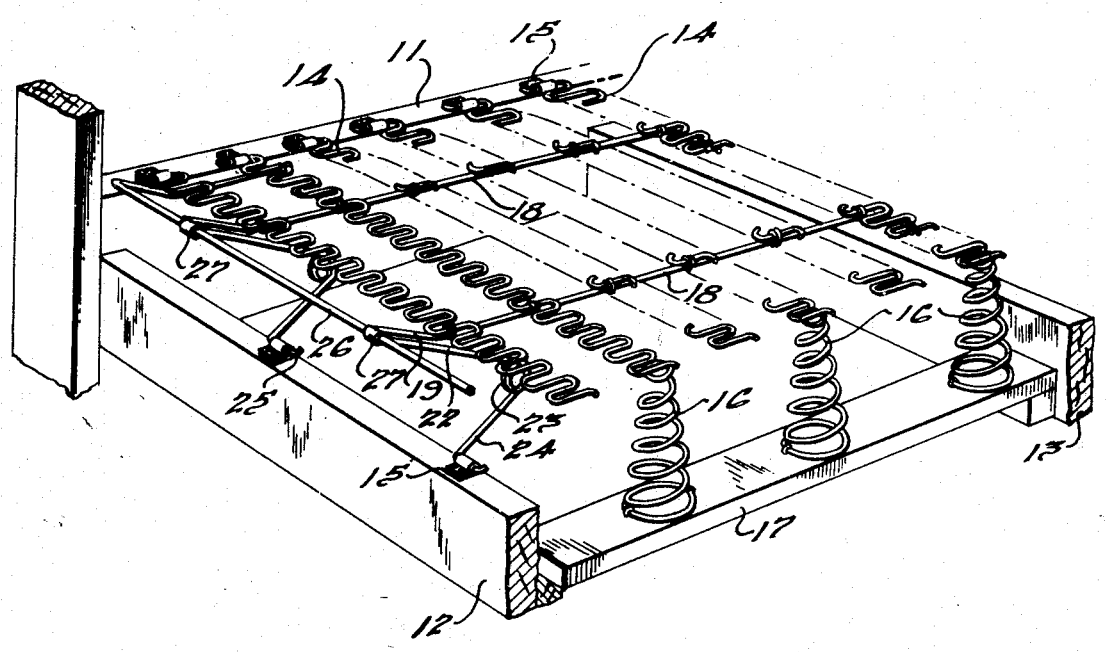
Fig. 2 is a perspective view of a portion of the seat illustrated in Fig. 1.
Figure 3:
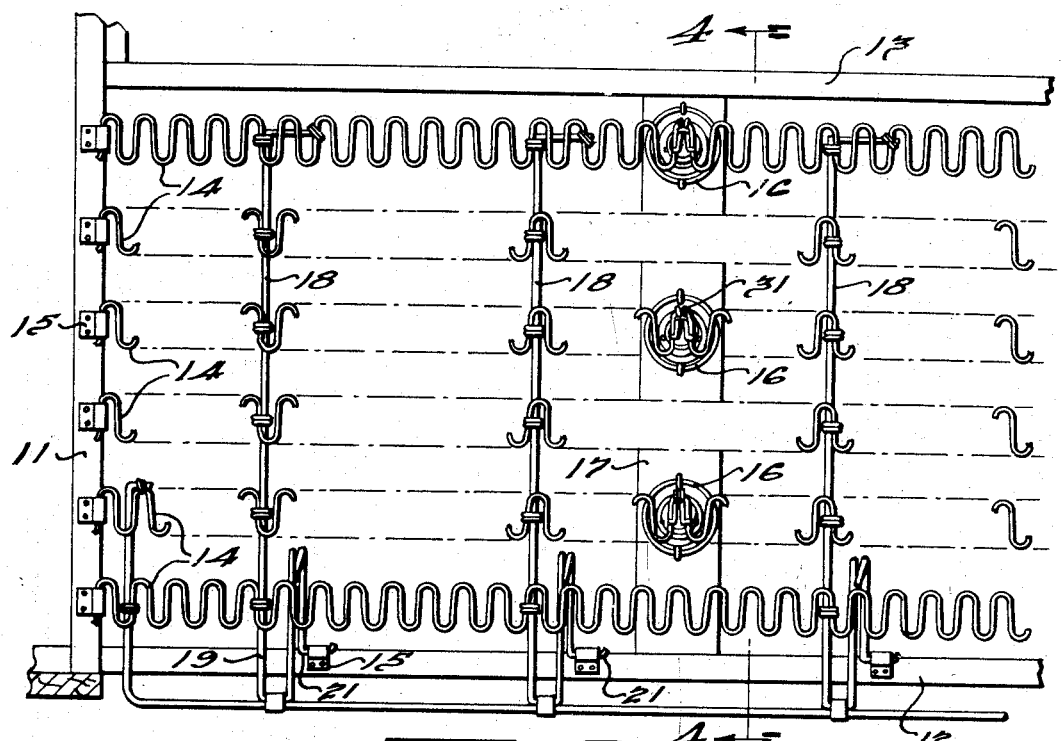
Fig. 3 is a broken plan view of the structure illustrated in Fig. 2.

The seat construction embodied in my invention is illustrated as being applied to a davenport, but it is to be understood that such showing was made more for the purpose of illustration, and that the construction is just as applicable to seats of chairs, automobiles, busses, and the like. The davenport 10 is provided with a pair of end rails 11 extending above front and rear rails 12 and 13. Sinuous spring strips 14 are anchored by clips 15 to the end rails 11 to form a spring surface. The sinuous spring strips 14 are manufactured to assume a curved or circular shape when the ends are unsupported so that when the ends are supported, as herein illustrated and described, a material resistance to downward deflection is inherent in the spring strips. When a long length of spring strip is employed, as herein illustrated in a davenport, I preferably provide additional support against deflection by a plurality of coil springs 16 which are mounted on a cross member 17 at predetermined spaced points along the length of the strips. In a chair construction the coil springs may be eliminated since the resistance against downward deflection within the spring strips themselves is sufficient to support the load to which the chair is subjected.

Figure 4:
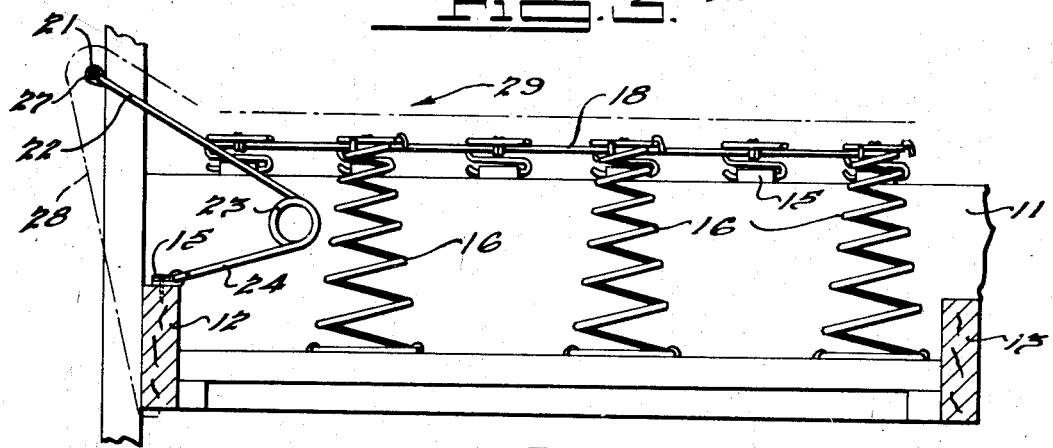
Fig. 4 is an enlarged sectional view of the structure illustrated in Fig. 3, taken on the line 4—4 thereof; and, Fig. 5 is a perspective view of the joining element for securing a coil spring to a sinuous strip.

The sinuous spring strips 14 are interconnected at spaced points by wires 18 which are hog ringed or otherwise secured to the strip. The rear end of the wires 18 are bent laterally and also hog ringed to the rearmost spring strip 14. The opposite end of the wire 18 is extended forwardly of the strip 14 and bent upwardly at 19, at right angles to form the web 21, and reversely bent to form the upper arm 22 and the coiled portion 23 of a jack spring. The wire is additionally extended at 24 to form the lower arm of the jack spring which is attached by clips 15 to the front rail 12 of the seat frame. A border wire 26 is joined to the webs 21 of the wires 18 by suitable rings 27. The wires 18 tie the spring strips together into a flexible spring surface having an upwardly projecting border 26 which is also deflectible and all of which is further resiliently supported at the front end by the jack spring portions of the wires. Suitable upholstering material 28, as illustrated in dot and dash lines in Fig. 4, encompasses the border element 26 and the front rail 12 to trim the soft front edge portion and is extended over the spring strips to provide the recessed surface 29 on which loose cushions of the seat are supported.

Figure 5:
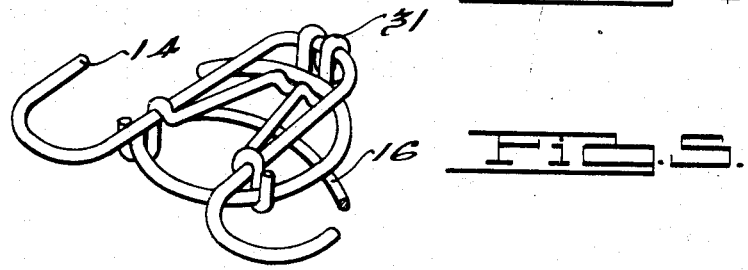

In Fig. 5, I have illustrated a clip 31 for attaching the ends of the coil springs 16 to the convolutions of the spring strips 14. The clip is illustrated and claimed in the copending application of A. Mouw, Serial No. 173,343, filed November 8, 1937, and assigned to the assignee of the present invention.

It will be noted in the illustrations that the coil springs are placed at the juncture between the three cushions employed on the davenport and that a pair of the jack springs and wires are disposed therebetween. The wire portion of the jack springs tie the sinuous spring strips into a unit surface while the jack spring portion thereof provides a soft edge and additional support for the frontmost spring strips. It is to be understood that suitable padding is provided on the surface formed by the spring strips, particularly when the loose seat cushions are not employed, such as in automobile cushions.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. The combination with a seat frame, a plurality of zig-zag spring strips stretched across and secured to spaced sides of said frame to form a spring surface, spaced wires interconnecting the strips and disposed normal thereto with the front end bent upwardly above said strips, and means for resiliently supporting the front end of the wire to the front portion of the frame.

2. The combination with a seat frame, a plurality of zig-zag spring strips stretched across and secured to spaced sides of said frame to form a spring surface, wires disposed normal to said spring strips at spaced points and secured thereto, and a border element at the front edge of said frame disposed frontwardly of the frontmost spring strip, the ends of said element projecting rearwardly and secured to at least one of said strips, said wires projecting forwardly and upwardly and secured to said border element above said spring surface.

3. The combination with a seat frame, a plurality of zig-zag spring strips stretched across and secured to spaced sides of said frame to form a spring surface, wires disposed normal to said spring strips at spaced points and secured thereto, and a border element at the front edge of said frame disposed frontwardly of the frontmost spring strip, the ends of said element projecting rearwardly and secured to at least one of said strips, said wires projecting forwardly and upwardly and secured to said border element, the rear ends of said wires being bent at an angle and secured to the rearmost spring strip.

4. The combination with a seat frame, a plurality of zig-zag spring strips stretched across and secured to spaced sides of said frame to form a spring surface, wires disposed normal to said spring strips at spaced points and secured thereto, a border element at the front edge of said frame disposed frontwardly of the frontmost spring strip, the ends of said element projecting rearwardly and secured to at least one of said strips, said wires projecting forwardly and upwardly and secured to said border element, the rear ends of said wires being bent at an angle and secured to the rearmost spring strip, and jack springs interconnecting the front edge of the frame to said wires and border element above the spring surface.

5. The combination with a seat frame, a plurality of zig-zag spring strips stretched across and secured to spaced sides of said frame to form a spring surface, wires disposed normal to said spring strips at spaced points and secured thereto, a border element at the front edge of said frame disposed frontwardly of the frontmost spring strip, the ends of said element projecting rearwardly and secured to at least one of said strips, said wires projecting forwardly and upwardly and secured to said border element, the rear ends of said wires being bent at an angle and secured to the rearmost spring strip, jack springs interconnecting the front edge of the frame to said wires and border element above said spring surface, and a plurality of coil springs supported beneath said spring strips and secured thereto between the supported ends of said strips.

6. The combination with a seat frame, a plurality of zig-zag spring strips stretched across and secured to spaced sides of said frame to form a spring surface, a border element extending forwardly from the frontmost spring strip having its ends secured thereto, and a plurality of jack springs secured to the front edge of the frame and to said border element, the upper arm of said jack springs extending above said strips and being further extended downwardly and rearwardly and interconnected to the plurality of spring strips.

7. The combination with a seat frame, a plurality of zig-zag spring strips stretched across and secured to spaced sides of said frame to form a spring surface, a border element extending forwardly from the frontmost spring strip having its ends secured thereto, and a plurality of jack springs secured to the front edge of the frame and to said border element, the upper arm of said jack springs extending above said strips and being further extended downwardly and rearwardly and interconnected to the plurality of spring strips, the end of said extended portion of said jack springs being deflected laterally and secured to the rearmost spring strip.

8. The combination with a seat frame, a plurality of zig-zag spring strips stretched across and secured to spaced sides of said frame to form a spring surface, a border element extending forwardly from the frontmost spring strip having its ends secured thereto, a plurality of jack springs secured to the front edge of the frame and to said border element, the upper arm of said jack springs extending above said strips being further extended downwardly and rearwardly and interconnected to the plurality of spring strips, the end of said extended portion of said jack springs being deffected laterally and secured to the rearmost spring strip, a brace between the front and rear members of said frame, and coil springs supported on said brace and connected to the underside of certain of said strips.

9. The combination with a seat frame, a plurality of sinuous spring strips stretched across and secured to opposite sides of said frame, a jack spring having one arm secured to the front element of the frame and having the upper arm projecting upwardly above the sinous spring strips and reversely bent downwardly in the plane of said upper arm and rearwardly in the plane of said spring strips, and means for securing said rearwardly extending projection to said strips.

10. The combination with a seat frame, a plurality of sinuous spring strips stretched across and secured to opposite sides of said frame, a jack spring having one arm secured to the front element of the frame and having the upper arm projecting upwardly above the sinuous spring strips and reversely bent downwardly in the plane of said upper arm and rearwardly in the plane of said spring strips, means for securing said rearwardly extending projection to said strips, and a border element having its ends secured to one of said spring strips and projected upwardly and frontwardly and secured to the ends of said upper arm of the jack spring.

11. The combination with a seat frame, a plurality of zig-zag spring strips stretched across and secured to opposite sides of said frame to form a spring surface, a jack spring having one arm secured to the frame and having the other arm projected upwardly above said strips and extending rearwardly and downwardly in the plane of said strips, and means for securing the extended portion to said strips.

12. The combination with a seat frame, a plurality of zig-zag spring strips stretched across and secured to opposite sides of said frame to form a spring surface, a jack spring having one arm secured to the frame and having the other arm projected upwardly above said strips and extending rearwardly and downwardly in the plane of said strips, means for securing the extended portion to said strips, and a border element having its ends secured to one of said spring strips and its laterally extending portion secured to the jack spring above said spring surface near the junction of said other arm and extended portion.

HENRY HOPKES.